: US007185238B2

United States Patent
Wedel et al.

(10) Patent No.: US 7,185,238 B2
(45) Date of Patent: Feb. 27, 2007

(54) DATA LOSS PREVENTION

(75) Inventors: Malte Wedel, Heidelberg (DE); Andreas Roessler, Sulzfeld (DE)

(73) Assignee: SAP AG, Walldorf (DE)

( * ) Notice: Subject to any disclaimer, the term of this patent is extended or adjusted under 35 U.S.C. 154(b) by 464 days.

(21) Appl. No.: 10/675,806

(22) Filed: Sep. 30, 2003

(65) Prior Publication Data

US 2005/0081121 A1    Apr. 14, 2005

(51) Int. Cl.
*G06F 11/00*    (2006.01)
(52) U.S. Cl. .................................... 714/100
(58) Field of Classification Search .............. None
See application file for complete search history.

(56) References Cited

U.S. PATENT DOCUMENTS

| 5,754,752 A * | 5/1998 | Sheh et al. ............... 714/4 |
| 5,974,549 A * | 10/1999 | Golan ...................... 726/23 |
| 5,978,842 A * | 11/1999 | Noble et al. ............ 709/218 |
| 6,052,730 A * | 4/2000 | Felciano et al. ......... 709/225 |
| 6,070,184 A * | 5/2000 | Blount et al. ............ 709/200 |
| 6,178,439 B1 * | 1/2001 | Feit ........................ 709/200 |
| 6,341,316 B1 * | 1/2002 | Kloba et al. ............ 709/248 |
| 6,594,697 B1 * | 7/2003 | Praitis et al. ........... 709/225 |
| 6,687,848 B1 * | 2/2004 | Najmi ..................... 714/4 |
| 6,710,786 B1 * | 3/2004 | Jacobs et al. ........... 715/744 |
| 6,848,000 B1 * | 1/2005 | Reynolds ................ 709/226 |
| 6,862,689 B2 * | 3/2005 | Bergsten et al. ........ 714/4 |
| 6,865,592 B1 * | 3/2005 | Shindo .................... 709/203 |
| 6,889,169 B2 * | 5/2005 | Kirshenbaum et al. .. 702/187 |
| 6,907,451 B1 * | 6/2005 | Mukundan et al. ..... 709/204 |
| 6,961,909 B2 * | 11/2005 | Lord et al. .............. 715/853 |
| 6,976,077 B1 * | 12/2005 | Lehew et al. ........... 709/229 |
| 7,010,568 B1 * | 3/2006 | Schneider et al. ...... 709/203 |
| 2002/0051541 A1 * | 5/2002 | Glick et al. ............. 380/258 |
| 2002/0116474 A1 * | 8/2002 | Copeland et al. ....... 709/219 |
| 2002/0194327 A1 * | 12/2002 | DeGilio et al. ......... 709/224 |
| 2003/0055825 A1 * | 3/2003 | Chen et al. ............. 707/10 |
| 2003/0135587 A1 * | 7/2003 | Fisher et al. ........... 709/219 |

* cited by examiner

*Primary Examiner*—Robert Beausoliel
*Assistant Examiner*—Amine Riad
(74) *Attorney, Agent, or Firm*—Finnegan, Henderson, Farabow, Garrett & Dunner, L.L.P.

(57) ABSTRACT

There are methods and apparatus, including computer program products, for preventing data loss. For example, there is a client agent that automatically performs a data loss prevention action in response to detecting (i) a client navigation event and (ii) a difference between a client data state and a base data state, wherein the detection of the difference between the client data state and the base data state occurs without transmitting data to and from a server. The data loss prevention action can include generating a user prompt. The navigation event can include a navigation that replaces a user interface that the user had used to modify data associated with an application program. The data loss prevention action can be performed without receiving instructions corresponding to the action from the application program.

27 Claims, 4 Drawing Sheets

DATA LOSS PREVENTION

BACKGROUND

The present invention relates to data processing by a computing device, and more particularly to data loss prevention techniques.

User interfaces facilitate the interaction between humans and computers by inviting and responding to user input. User interfaces come in many varieties, and are designed to work in concert with application programs. A common scenario involving user interfaces is a network application, where a network connects an application program running on a server and one or more user interfaces running on client devices. The client/server relationship is one in which a server provides services to the client devices. Both the client devices and the server typically have a network interface for accessing networks such as a local area network (LAN), a wide area network (WAN), or the Internet.

In a network environment, a common client device is a personal computer and a common client program with a user interface is a Web browser. The client program enables networked communication between the client device and a server using a data transfer protocol, e.g., the Hypertext Transfer Protocol (HTTP), to exchange files, images, or programs. HTTP is a request/response-type protocol that specifies how the client device and the server communicate with each other. The server may receive a request from the client device using HTTP, respond to the request, and then close the connection. HTTP is a stateless protocol, meaning that each time a client device requests a Web page, the server will respond to the request independently of any previous requests by the client device, and without recording the request.

The contents of a file transmitted from the server and intended for display in the client program on the client device may be marked up with Hypertext Markup Language (HTML) code or Extensible Markup Language (XML) code. HTML is a language that is used to describe the structure of a document, such as a Web page. Client programs interpret HTML code to determine how to display the information contained in the page. A user may request a Web page from a server by clicking on a hyperlink or specifying a Uniform Resource Locator (URL) string. A URL can be used to identify the address of a file that may be accessed on the Internet. The address identifies the Web server on which the file is stored and the directory in which the file is located. When the server receiving the URL request finds the sought Web page, the server sends the page to the client device so that the client device can use that Web page, for example, by generating a display for a user according to the Web page.

SUMMARY OF THE INVENTION

The invention provides methods and apparatus, including computer program products, for preventing data loss. In one implementation where a client program (e.g., a Web browser) renders a user interface (e.g., Web page) for a network application, there is a client agent that monitors the state of the application data at the client program (e.g., client data state) to detect when the data at the client program is not identical (e.g., due to user modification) to the data sent from the application program (e.g., base data state). If the client agent detects a difference between the data at the client program and the data sent from the application program, and the user attempts to navigate to a different Web page, the client agent automatically performs a data loss prevention action. The action can temporarily prevent the navigation and enables the user to save any modification to the application data at the client, so as to prevent changes made by the user to the application data at the client from being lost due to the completion of the navigation request.

In one aspect, there is a computer program product, tangibly embodied in an information carrier, for performing a data loss prevention action. The computer program product is operable to cause data processing apparatus to detect a client navigation event. The computer program product is also operable to detect a difference between a client data state and a base data state without transmitting data to and from a server. The computer program product is also operable to perform a data loss prevention action, such as generating a user prompt, in response to the client navigation event if the difference between the client data state and the base data state is non-null. In other examples, the computer program product can include one or more of the following features. The computer program product can include instructions to generate a user prompt without receiving instructions corresponding to the user prompt from an application program associated with the base data state. The base data state can include a state of data at a point in time when there is synchronization between a client and the server. The computer program can include instructions to prevent navigation associated with the navigation event.

The navigation event can include one more of the following: changing an address field; selecting functionality to change contents displayed in a browser window; closing a browser window; selecting functionality to navigate backward; selecting functionality to navigate forward; and pressing a logoff button. The computer program product can include instructions to store the client data state in a first data structure. The first data structure can include a data tree and/or an XML file. The computer program product can include instructions to store the base data state in a second data structure and to compare contents of the first data structure to contents of the second data structure. The computer program product can include instructions to employ JavaScript code. The computer program product can include instructions to track changes to the client data state using a client agent.

The computer program product can include instructions to perform the data loss prevention action before performing an action associated with the navigation event. The computer program product can include instructions to monitor user interactions with a user interface to detect a change in a client state of application data. The data loss prevention action can include generating a user prompt. The user prompt can enable a user to select a predetermined action. The predetermined action can include transmitting the difference to a server. The user prompt can enable a user to select an action from a list of predefined actions. The computer program product can include instructions to perform an action from the list selected by the user. The user prompt can be generated before the navigation event is completed. The computer program product can include instructions to perform the navigation event after the action is completed. The list of predefined actions can include transmitting the difference to a server and discarding the difference.

In another aspect, there is a system for performing a data loss prevention action. The system includes a client agent. The client agent includes a data manager module, a detection module, and a generation module. The data manager module is configured to detect a difference between a client data state and a base data state without transmitting data to and from the server. The detection module is configured to detect a navigation event. The generation module is configured to perform a data loss prevention action, such as generate a user prompt, in response to the navigation event and the difference.

In other examples, the system can include one or more of the following features. The system can include a storage module including the client data state. The system can include a storage module including the base data state. The system can include a client program including the client agent. The system can include a client device including the client agent. The system can include a server including an application having data associated with the base data state. In some examples, the user prompt is not generated in response to the application. The client agent can be implemented using JavaScript code.

In another aspect, there is a method for performing a data loss prevention action. The method includes detecting a client navigation event. The method also includes detecting a difference between a client data state and a base data state without communicating with a server. The method also includes performing a data loss prevention action, such as generating a user prompt, in response to the detected client navigation event and the detected difference. In other examples, the method can also include using a client agent to detect a difference and/or any of the features described above for other aspects.

The invention can be implemented to realize one or more of the following advantages. A client agent can provide run-time management of user interfaces independent of a software application executing on a server. The application programmer does not need to generate code for tracking user modifications and performing an action (e.g., generating a prompt) to prevent data loss. There is no accidental data loss when a user intentionally or inadvertently navigates away from a user interface after making modifications to data. A client agent can be platform- and device-independent, allowing standard browsers on different client devices to incorporate the techniques described herein. Software applications can be deployed more easily over a network, with the client agent providing greater features than those of standard browser client programs. The client agent can reduce the number of round trips across a network needed to enter or store application data, while providing a mechanism to ensure data changes on the client are not accidentally lost. One implementation of the invention provides all of the above advantages.

The details of one or more examples are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
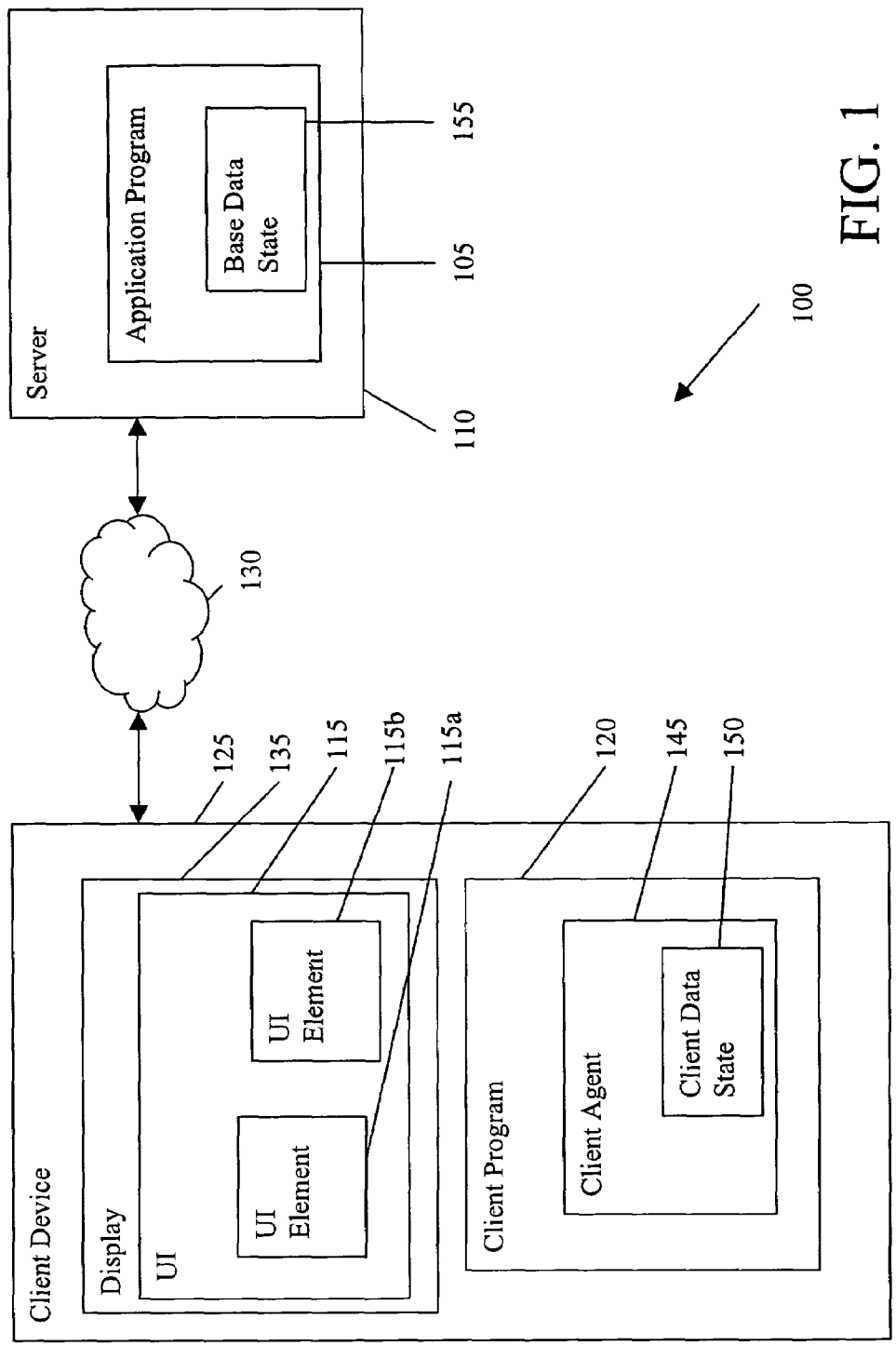
FIG. 1 is a block diagram of a computing system that allows a user to interact with a software application over a network.

As shown in FIG. 1, a system 100 to allow a user to interact with a software application program 105 running on a server 110 through a user interface 115 rendered by a client program 120 (e.g., a Web browser, a portal application, and the like) running on a client device 125. Client device 125 communicates with server 110 over network 130, which includes, for example, a portion of the Internet. Client device 125 includes a display 135 and client program 120. Client program 120 is configured to communicate with server 110 using network 130 and to render the contents of one or more Web pages received from server 110. The user interface (UI) 115 contains user interface elements 115a and 115b, also referred to as controls. A control is a user interface element (e.g., 115a) through which a user interacts with, provides input to, and/or controls an application (e.g., application program 105). Some examples of controls are text fields, radio buttons, tables, trays, and drop-down menus.

In operation, application program 105 generates, maintains, retrieves, and/or manipulates data. When the user wants to interact with application program 105, the user initiates interaction, for example, by specifying a URL using client program 120. In response to the specified request, server 110 provides a Web page containing UI 115 associated with application program 105. UI 115 enables a user to view and modify data associated with application 105 using UI elements 115a and 115b. For example, UI element 115a can be a table displaying the names and addresses of employees.

Server 110 also provides a client agent 145. Client agent 145 performs the functions associated with data loss prevention described in more detail below. Client agent 145 can be implemented, for example, using software code that client program 120 can process and execute. In this way, client agent 145 adds the functions associated with data loss prevention to client program 120, which does not normally have these functions. It is noteworthy that client agent 145 is a separate piece of software that provides enhanced functionality independent of application program 105. That is, application program 105 does not need to generate code and/or instructions to implement the functionality provided by client agent 145.

For an example using the Internet and a Web browser client, client agent 145 includes executable code that is implemented using JavaScript code. To deliver the JavaScript code, server 110 can, for example, embed the JavaScript code directly in a Web page or store the code as a separate file that is referenced in a Web page and downloaded by client program 120 when client program 120 processes that Web page. The delivery of client agent 145 can be separate from the delivery of UI 115. As part of the delivery mechanism, server 110 can use information about client device 125 and/or client program 120 to determine an appropriate client agent 145 for that client device 125 and client program 120. For example, a request to server 110 using HTTP includes information about client device 125 (e.g., processor type, operating system) and/or client program 120 (e.g., browser type, browser version). Server 110 receives this information with the request and transmits to client device 125 a version of client agent 145 that is compatible with (i.e., can be executed by) the browser type and version included in the information.

One feature that client agent 145 provides is a mechanism that prevents loss of application data at client program 120 after the data has been modified by the user but has not yet been sent to application program 105. This is sometimes referred to as a client being in a "dirty" state. Such a mechanism is advantageous when, for example, to improve the performance of UI 115, modifications are accumulated at client device 125 until a determined time to optimize performance. This mechanism is triggered when, for example, the user, using client program 120, changes data at client program 120 associated with application program 105 (e.g., creates a dirty state) and navigates, for example, to a different Web page (e.g., using the back button, using the forward button, or entering a new URL).

To prevent possible loss of the user modifications, client agent 145 tracks any modification to the data at client program 120 that have not yet been sent to application program 105. The current values of data at client program 120, from the point of view of client device 125, are referred to as a client data state 150. Because client data state 150 is from the point of view of client device 125, any modifications by the user at client device 125 are immediately reflected in client data state 150. The base values of data at client program 120, from the point of view of server 110, are referred to as a base data state 155. Because base data state 155 is from the point of view of server 110, any modifications by the user at client device 125 are not reflected in base data state 155 until client device 125 transmits those modifications to server 110. In other words, base data state 155 represents the data state when the values of the data at the client program 120 are in synchronization with the data values from server 110 (e.g., when data is transmitted from server 110 to client device 125, when modifications are transmitted from client device 125 to server 110). By definition, client data state 150 is identical to base data state 155 for the time after server 110 transmits data to client device 125 but before the user modifies any of that transmitted data. Client data state 150 then changes and is different from base data state 155 as the user modifies data using UI 115.

For a simple example to help illustrate, with UI 115 including a table of employees, server 110 transmits to client device 125 the values of the data from application 105, where one row has the values name=John Smith and address=108 Maple Street. From the point of view of server 110, the values of data for this row at client device 125, the base data state 155, are name=John Smith and address=108 Maple Street. From the point of view of client device 125, the values of data for this row at client device 125, the client data state 150, are also name=John Smith and address=108 Maple Street. When the user modifies the address of employee John Smith so that the value of address=91 Elm Street, from the point of view of client device 125, the values of data for this row at client device 125, the client data state 150, are now name=John Smith and address=91 Elm Street. From the point of view of server 110, however, the values of data for this row at client device 125, the base data state 155, are still name=John Smith and address=108 Maple Street because the change made at client device 125 has not yet been transmitted to server 110 and server 110 is not aware, in a machine sense, of the change. If and when the change is transmitted to server 110, then the base data state 155 will updated to include the changes and then the client data state 150 will be identical to the base data state 155.

While modifying data at client program 120 and before the modifications are transmitted to server 110, a user can intentionally or inadvertently navigate from the UI element that the user is currently using. For example, this navigation can be caused by entering another URL, thereby causing client program 120 to replace UI 115 with another Web page. When the user performs an action to navigate away from the current UI element, client agent 145 determines whether there is a difference between client data state 150 and base data state 155 (e.g., dirty state), as described in more detail below. If there is a difference, this represents that a user action has caused application data at client program 120 to be different from the application data transmitted from application program 105 by server 110. If there is a difference, client agent 145 generates a prompt to the user to determine whether the user wants to save changes made to the data at the client program 120 but not yet transmitted to server 110. It is noteworthy that, as described above, application program 105 does not need to provide any code to generate this user prompt. In other words, generating the user prompt, and the accompanying tracking of navigation events and data modification, are services provided by client agent 145, and so application program 105 does not need to provide them.

Figure 2:
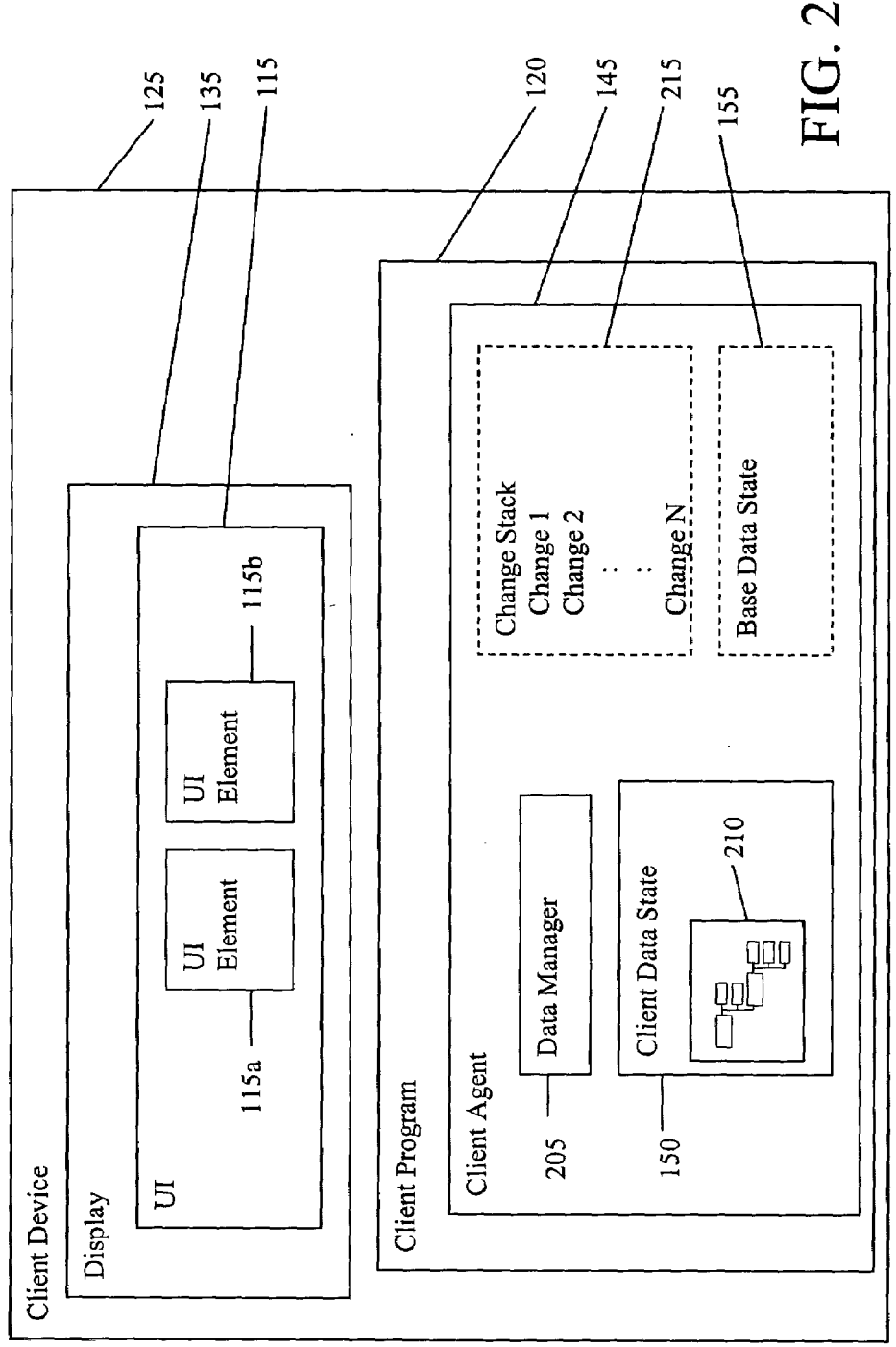
FIG. 2 is a block diagram of a client device.

FIG. 2 illustrates client device 110 in more detail. To track data modifications, client agent 145 includes a data manager 205 that manages changes to the state of application data at client program 120 corresponding to actions from a user interacting with UI 115 (e.g., modification of the data). To store the current state of data, the illustrated client data state 150 can be represented as a data structure, e.g., data tree 210. Data tree 210 includes nodes. In one example, a portion of the nodes corresponds to UI elements (e.g., 135a and 135b). When the user interacts with a UI element, the UI element notifies data manager 205 of any modifications the user makes to application data associated with that UI element. For example, if UI element 135a is a text box and the user changes the text in UI element 135a, UI element 135a triggers one or more events indicating that the text has been changed. Data manager 205 receives the one or more events and updates the one or more nodes of data tree 210 that correspond to the data state of UI element 135a.

In different examples, in addition or as an alternative to monitoring data tree 210, client agent 145 determines whether the user has modified any data, such that client data state 150 is different from base data state 155, using one or a combination of the following implementations. In one example, data manager 205 can optionally maintain a stack 215 or other data structure recording all of the changes to client data state 150 that have not been transmitted to application program 105. If stack 215 is not empty, client agent 145 determines that the user has modified the data without saving or transmitting the modifications, and that client data state 150 is therefore different from base data state 155.

In another example, client agent 145 can also include functionality to determine whether a change in stack 215 reverses a previous change back to an original value. Using the address example above, one change in stack 215 includes information that the value for address for John Smith was changed from "123 Maple Street" to "91 Elm Street". Another change in stack 215 includes information that the value for address for John Smith was changed from "91 Elm Street" to "123 Maple Street". Even though stack 215 is not empty, if these are the only two changes in stack 215, client agent 145 determines that the net result is no change between client data state 150 and base data state 155.

In another example, also illustrated, client agent 145 can optionally maintain a copy of base data state 155 (e.g., a copy of the values of the data transmitted by server 110 to client device 125 or a copy of the modified values of the data sent from client device 125 to server 110). Client agent 145 can determine whether the user has modified the data by comparing client data state 150 to base data state 155 and determining the differences. In another example, there is an indicator (e.g., a flag) associated with the data that indicates whether the data has been changed at client device 135. The indicator can be set, for example, by data manager 205 when the user modifies the indicator's associated data. In this example, client agent 145 can determine whether the user has modified the data by reading the indicators. It is noteworthy that in all of these examples, client agent 145 does not need to transmit data to server 110 or receive data from server 110 to determine if UI 115 is in a dirty state. Client agent 145 can make this determination from the data at client device 125.

In addition to detecting changes to data, client agent 145 also detects user interaction causing navigation events that could result in a loss of user modifications that have not been saved to server 110. In one example, client agent 145 has event handlers associated with navigation events. These navigation events can include events associated with navigating in client program 120, outside of UI 115. These events include, for example, changing contents (e.g., the URL) in an address bar, or executing a URL navigation triggered by another application (e.g., Web portal example) or a hyperlink. These events can also include selecting functionality to navigate backward or forward, for example by pressing a back button or a forward button. These events can also include changing contents of a browser window, for example, by performing an action that causes the display of a new or updated Web page, or closing a browser window completely. One characteristic associated with these navigation events is that neither application program 105 nor UI 115 know, in a machine sense, that the requested navigation is about to cause UI 115 to be replaced. These navigation events are independent of application program 105 and UI 115. By detecting these types of navigation events, client agent 145 ensures that if a user has modified data, the user is given an opportunity to save the changes (e.g., using a prompt) before UI 115 is replaced.

Figure 3:
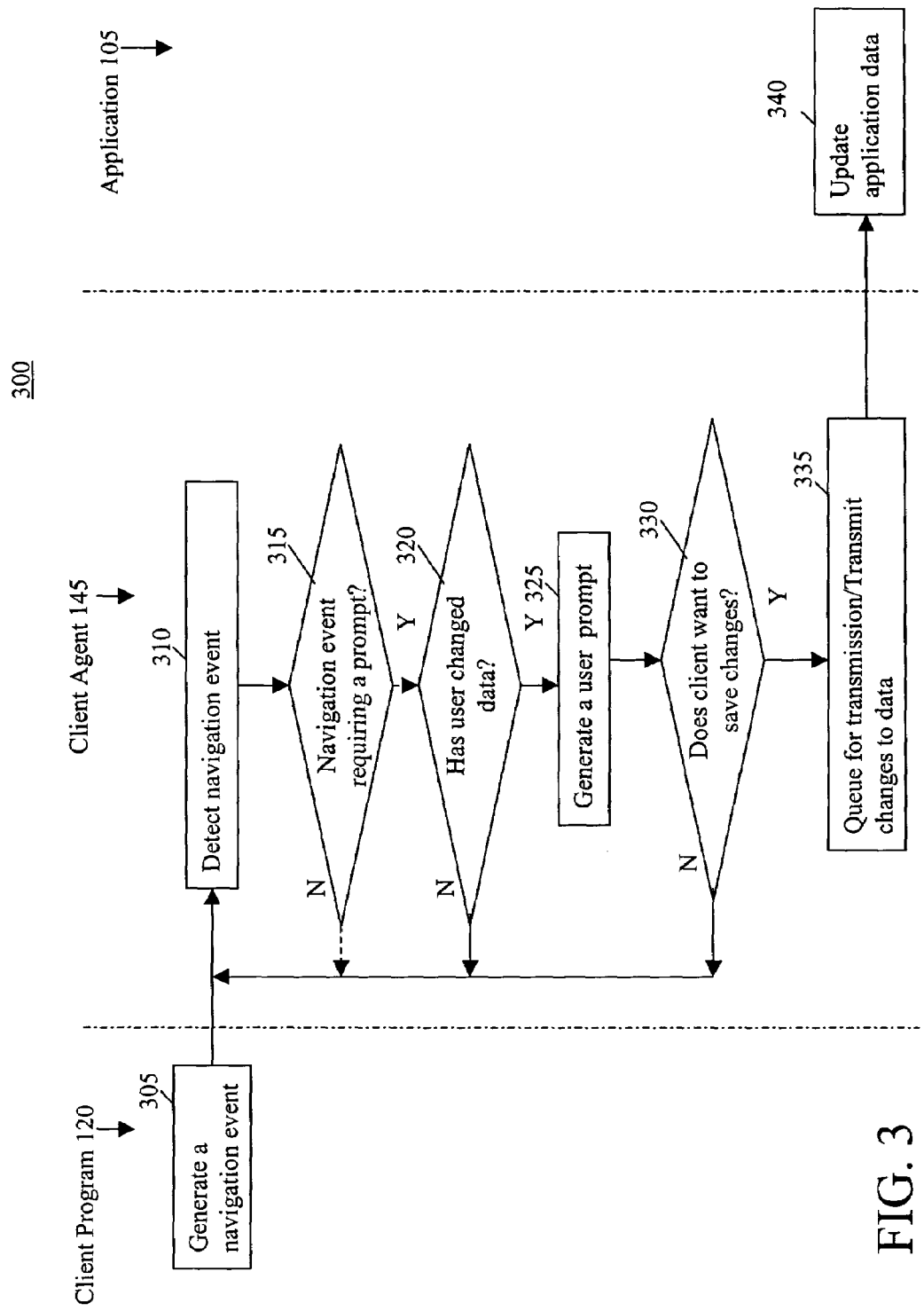
FIG. 3 is a block diagram of a process to prevent data loss.

FIG. 3 illustrates a process 300 that can be used, e.g., by a client agent 145, to determine whether to generate a user prompt in response to detecting one or more navigation events. Process 300 is illustrated using client program 120, client agent 145, and application program 105, depicted in FIGS. 1 and 2. Client program 120 generates 305 a navigation event in response to a user action. As described above, client program 120 can generate a navigation event, for example, in response to a user entering a new URL in the address window and clicking a "go" button. Note that these example actions can generate several navigation events (e.g., change of focus, mouse-over, mouse-click) and therefore the term "navigation event" as used herein can refer to one individual navigation event, or a group or a particular sequence of navigation events. Client agent 145 detects 310 the navigation event using one or more known techniques. For example, client agent 145 can include code to intercept an event, capture an event, and/or receive notification on the occurrence of an event for which client agent 145 has subscribed.

Client agent 145 determines 315 whether the navigation event is a navigation event requiring a prompt, such as any of the navigation events described above. If client agent 145 determines 315 that the navigation event is an event for which a user prompt may be needed, client agent 145 determines 320 whether the user has changed any data associated with application program 105 without transmitting such changes to application program 105 or otherwise saving the changes (e.g., dirty state). Client agent 145 can determine 320 this as described above.

If client agent 145 determines 315 that the navigation event is not an event for which a user prompt may be needed or determines 320 the user has not changed any data associated with application program 105, client agent 145 does nothing to prevent the navigation and waits 305 for another navigation event without generating a user prompt. If client agent 145 determines 320 that the user has changed data at client device 125 associated with application program 105, client agent 145 prevents the navigation and generates 325 a user prompt. For example, to prevent the navigation, client agent 145 can intercept the event before processed by client program 120.

The user prompt notifies the user that he or she has made some changes to the data associated with application program 105 at client program 120 and also allows the user to select an action. For example, the user prompt can be the type familiar to many computer users asking them whether they want to save the changes that they made, and giving them a "Yes" button and a "No" button to select their desired response. If the user clicks the "No" button, client agent 145 determines 330 that the user does not want to save the changes. In response, client agent 145 removes the mechanism preventing the navigation (e.g., returns the navigation event to the event queue for processing by client program 120) and waits for another navigation event. If the user clicks the "Yes" button, client agent 145 queues and/or transmits 335 the changes to server 110 using (invoking), for example, the same processes that a "submit" button UI element uses. In such a case, application 105 updates 340 the application with the data modifications. As an alternative, the prompt can simply be a text message which warns the user that the requested navigation will change UI 115 and that the user must use the submit button to save changes that have been detected. In this case, the prompt can have an "OK" button, and the button and prompt are displayed and navigation prevented until the user clicks the "OK" button and/or the user clicks the submit button.

The user prompt can also be more sophisticated than described above. For example, the user prompt can also include a "cancel" button that prevents the navigation from happening. The user prompt can also list each of the data changes that are on the change stack. In one example there is a checkbox next to each change and the user can select which changes the user wants to save (e.g., transmit to application program 105) and which changes can be discarded (i.e., removed from the change stack).

Figure 4:
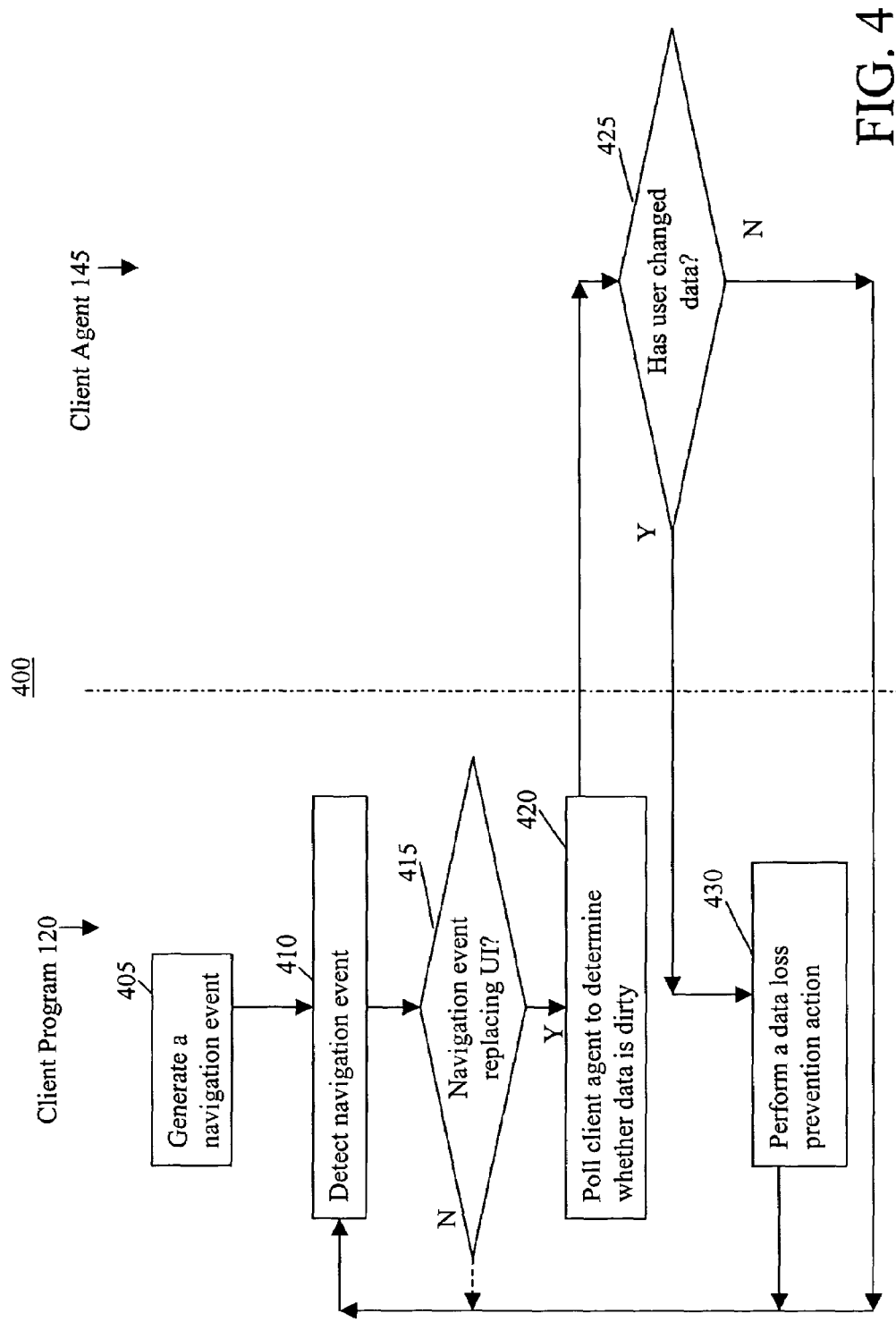
FIG. 4 is a block diagram of a process to prevent data loss.

In other examples, a portion of the functions of client agent 145 is distributed to client program 120 and other data loss prevention actions, as an alternative or in addition to the user prompt are performed. For example, FIG. 4 illustrates a process 400 where a portion of the functions of client agent 145 is distributed to client program 120. In this example, client program 120 is a portal application. Client program 120 generates 405 a navigation event in response to a user entering a new URL in the address window and clicking a "go" button. Client program 120 detects 410 the navigation event because the portal application controls display 135.

Client program 120 determines 415 whether the navigation event is a navigation event requiring a data loss prevention action. For example, because client program 120 controls display 135, client program 120 determines whether the navigation event is one for which UI 115 will be replaced. If client program 120 determines 415 that the navigation event is an event for which UI 115 will be replaced, client program 120 polls 420 client agent 145 to determine whether the data is dirty. Client agent 145 can determine 425 if there is unsaved data modifications as described above.

If client program 120 determines 415 that the navigation event is not an event for which a user prompt may be needed or receives an answer from client agent 145 that the user has not changed any data associated with application program 105 (e.g., not dirty), client program 120 does nothing to prevent the navigation and waits to detect 410 another navigation event without performing a data loss prevention action. If client agent 145 determines 320 that the user has changed data associated with application program 105, client program 120 performs 430 a data loss prevention action in addition to or as an alternative to generating a user prompt as described above.

In other examples, client agent 145 can be included as part of a client-side framework. Similar to client agent 145, the client-side framework is separate from and independent of application 105. The client-side framework provides additional data management functions at client device 125 so that application 105 does not have to provide any code or instructions for those additional data management functions. Such additional data management functions can include, for example, data type validation for inputs, error detection and correction schemes, and user input help. The client-side framework can be implemented using, for example, JavaScript code.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

The invention has been described in terms of particular embodiments. Other embodiments are within the scope of the following claims. The following are examples for illustration only and not to limit the alternatives in any way. The steps of the invention can be performed in a different order and still achieve desirable results. Also, although the client agent was described being implemented using JavaScript, other languages, including other scripting languages can be used. For example, other scripting languages can include JScript and/or other languages compliant with the European Computer Manufacturing Associations ECMAScript Language Specification. Although the client agent is illustrated as residing in the client program, some or all of the described functionality can be distributed in other portions of the client device. Also, in addition to the examples above, other portions, or even all of the functionality of the client agent can be incorporated into the client program. Navigation events other than those described above may also trigger a data loss prevention action.

What is claimed is:

1. A computer program product, tangibly embodied in a computer-readable storage medium, for generating a data loss prevention prompt, the computer program product being operable to cause data processing apparatus to:
   detect a client navigation event;
   without transmitting data to and from a server, detect whether there is a difference between a client data state and a base data state; and
   in response to the client navigation event, generate a user prompt if the difference between the client data state and the base data state is non-null.

2. The computer program product of claim 1, further comprising instructions to generate a user prompt without receiving instructions corresponding to the user prompt from an application program associated with the base data state.

3. The computer program product of claim 1, wherein the base data state comprises a state of data at a point in time when there is synchronization between a client and the server.

4. The computer program product of claim 1, further comprising instructions to prevent navigation associated with the navigation event.

5. The computer program product of claim 1, wherein the navigation event comprises at least one of:
   changing an address field;
   selecting functionality to change contents displayed in a browser window;
   closing a browser window;
   selecting functionality to navigate backward;
   selecting functionality to navigate forward; and
   pressing a logoff button.

6. The computer program product of claim 1, further comprising instructions to store the client data state in a first data structure.

7. The computer program product of claim 6, wherein the first data structure comprises at least one of a data tree and an XML file.

8. The computer program product of claim 6, wherein instructions to detect the difference further comprise instructions to:
   store the base data state in a second data structure; and
   compare contents of the first data structure to contents of the second data structure.

9. The computer program product of claim 1, wherein instructions to provide the client agent further comprise instructions to employ JavaScript code.

10. The computer program product of claim 1, further comprising instructions to track changes to the client data state using the client agent.

11. The computer program product of claim 1, further comprising instructions to generate the user prompt before performing an action associated with the navigation event.

12. The computer program product of claim 1, further comprising instructions to monitor user interactions with a user interface to detect a change in a client state of application data.

13. The computer program product of claim 1, wherein the user prompt enables a user to select a predetermined action.

14. The computer program product of claim 13, wherein the predetermined action comprises transmitting the difference to a server.

15. The computer program product of claim 1, wherein the user prompt enables a user to select an action from a list of predefined actions, the computer program product further comprising instructions to perform an action from the list selected by the user.

16. The computer program product of claim 1, wherein the user prompt is generated before the navigation event is completed, the computer program product further comprising instructions to perform the navigation event after the action is completed.

17. The computer program product of claim 16, wherein the list of predefined actions comprises:
   transmitting the difference to a server; and
   discarding the difference.

18. A system generating a data loss prevention prompt, the system comprising:
   a client device executing a client agent, said client agent including:
      a data manager module configured to detect a difference between a client data state and a base data state;
      a detection module configured to detect a navigation event without transmitting data to and from a server; and
      a generation module configured to generate a user prompt in response to the navigation event and the difference, said client device displaying said user prompt.

19. The system of claim 18 further comprising a storage module including the client data state.

20. The system of claim 18 further comprising a storage module including the base data state.

21. The system of claim 18 further comprising a client program including the client agent.

22. The system of claim 18 further comprising a client device including the client agent.

23. The system of claim 18 further comprising the server including an application having data associated with the base data state.

24. The system of claim 23, wherein the user prompt is not generated in response to the application.

25. The system of claim 18, wherein the client agent is implemented using JavaScript code.

26. A method for performing a data loss prevention action, the method comprising:
   detecting a client navigation event;
   detecting a difference between a client data state and a base data state without communicating with a server; and
   generating a user prompt in response to the detected client navigation event and the detected difference.

27. The method of claim 26 wherein detecting a difference further comprises using a client agent.

* * * * *